US007129969B2

(12) United States Patent
Fukuda

(10) Patent No.: US 7,129,969 B2
(45) Date of Patent: Oct. 31, 2006

(54) TELEPHONE UNIT HAVING TELEPHONE DIRECTORY WITH PICTURE DATA AND METHOD FOR GENERATING TELEPHONE DIRECTORY WITH PICTURE DATA

(75) Inventor: Michiko Fukuda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/043,784

(22) Filed: Nov. 7, 2001

(65) Prior Publication Data

US 2002/0180863 A1 Dec. 5, 2002

(30) Foreign Application Priority Data

Nov. 17, 2000 (JP) .............................. 2000-351556

(51) Int. Cl.
H04N 7/14 (2006.01)
(52) U.S. Cl. ............................. 348/14.01; 348/14.03; 348/14.13; 379/93.17
(58) Field of Classification Search .. 348/14.01–14.04, 348/14.06–14.09, 14.1, 14.12–14.13; 379/93.17, 379/93.19, 93.21, 93.23, 142.06–142.07, 379/142.17, 355.07–355.09; 375/240.14; 370/260–261; 709/205, 217
See application file for complete search history.

(56) References Cited

U.S. PATENT DOCUMENTS

| 5,345,258 | A | * | 9/1994 | Matsubara et al. ....... 348/14.06 |
| 5,353,062 | A | * | 10/1994 | Maeda ................... 375/240.14 |
| 5,396,269 | A | * | 3/1995 | Gotoh et al. ............. 348/14.04 |
| 5,414,457 | A | * | 5/1995 | Kadowaki et al. ....... 348/14.03 |
| 5,546,447 | A | * | 8/1996 | Skarbo et al. ......... 379/142.05 |
| 5,778,054 | A | * | 7/1998 | Kimura et al. ........... 379/93.23 |
| 5,872,923 | A | * | 2/1999 | Schwartz et al. ........... 709/205 |
| 5,907,604 | A | * | 5/1999 | Hsu ....................... 379/142.06 |
| 5,936,945 | A | * | 8/1999 | Shibata et al. .............. 370/260 |
| 6,069,648 | A | * | 5/2000 | Suso et al. ............... 348/14.02 |
| 6,078,721 | A | * | 6/2000 | Uchimi et al. ................ 386/68 |
| 6,470,381 | B1 | * | 10/2002 | De Boor et al. ............ 709/217 |
| 6,766,018 | B1 | * | 7/2004 | Morita .................. 379/355.09 |

FOREIGN PATENT DOCUMENTS

| CN | 1292615 A | | 4/2001 |
| EP | 0 436 345 A2 | | 7/1991 |
| EP | 1 058 437 A2 | | 12/2000 |
| EP | 1 067 748 A2 | | 1/2001 |
| JP | 03009685 A | * | 1/1991 |
| JP | 03-162087 | | 7/1991 |
| JP | 04341087 A | * | 11/1992 |
| JP | 404310053 A | * | 11/1992 |

(Continued)

Primary Examiner—Melur Ramakrishnaiah
(74) Attorney, Agent, or Firm—Scully, Scott, Murphy & Presser, P.C.

(57) ABSTRACT

When a telephone unit communicates with a communication party using a television telephone function, a receiving portion of the telephone unit receives compressed moving picture data from the communication party having a moving picture encoder through a communication network. While the received moving picture compressed data is successively decoded by a moving picture decoder and displayed on a displaying device or the like, when the user of the telephone unit performs an inputting operation equivalent to a shutter operation, one frame of decoded picture data at the timing is supplied to a still picture encoder and encoded as still picture compressed data. In addition, a communication party telephone number detecting portion detects the telephone number of the communication party and stores it to a telephone directory along with the compressed still picture data.

16 Claims, 4 Drawing Sheets

FOREIGN PATENT DOCUMENTS

| | | | |
|---|---|---|---|
| JP | 05007356 A | * | 1/1993 |
| JP | 05153286 A | * | 6/1993 |
| JP | 06-121302 | | 4/1994 |
| JP | 8-130720 | | 5/1996 |
| JP | 08-242307 | * | 9/1996 |
| JP | 8-242307 | | 9/1996 |
| JP | 09-083982 | | 3/1997 |
| JP | 09-163329 | | 6/1997 |
| JP | 11-041339 | | 2/1999 |
| JP | 11-205761 | | 7/1999 |
| JP | 2000-092184 | | 3/2000 |
| JP | 2000-151851 | | 5/2000 |
| JP | 2000-253137 | | 9/2000 |
| WO | WO 99/35874 | | 7/1999 |

* cited by examiner

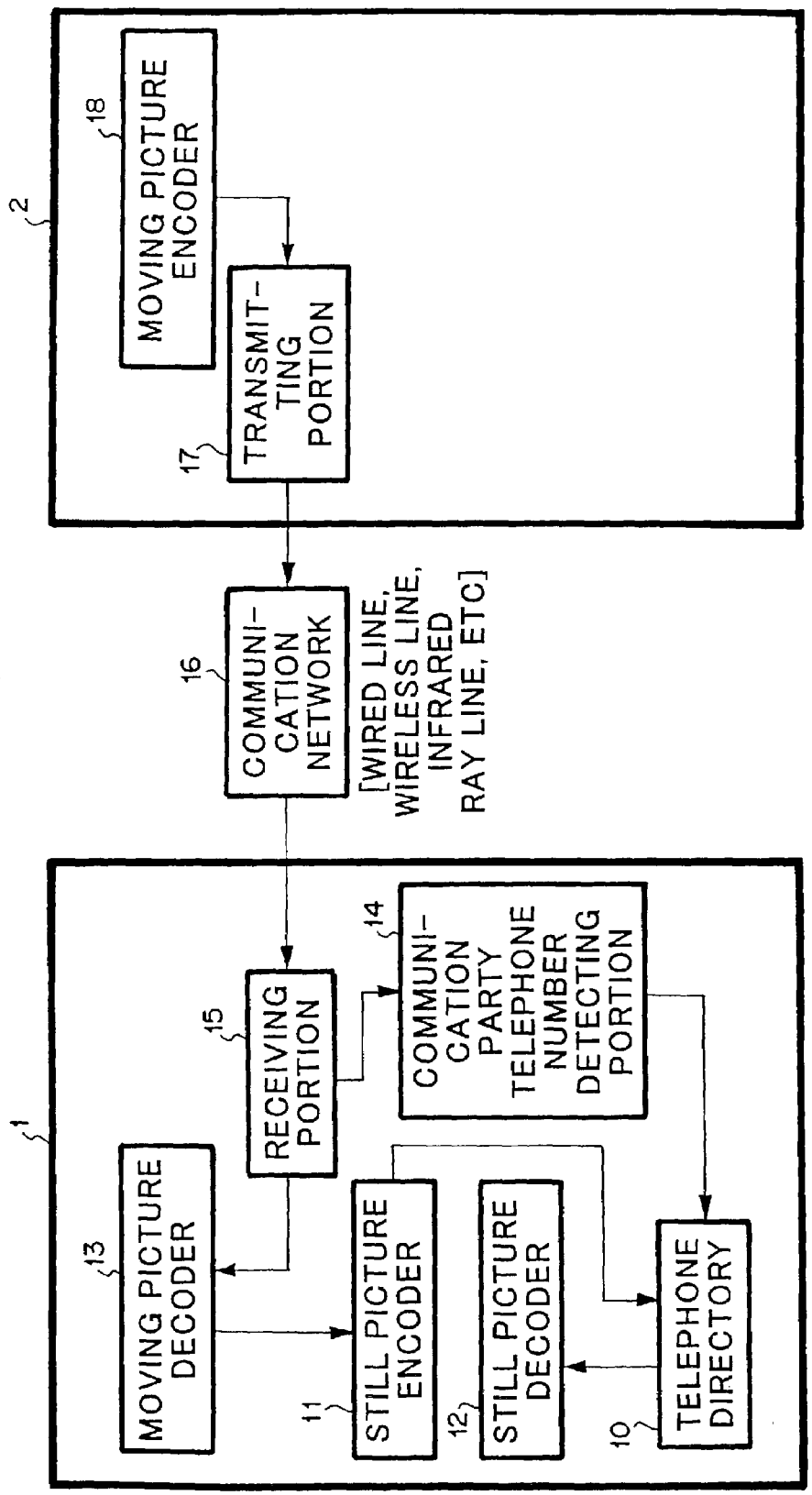

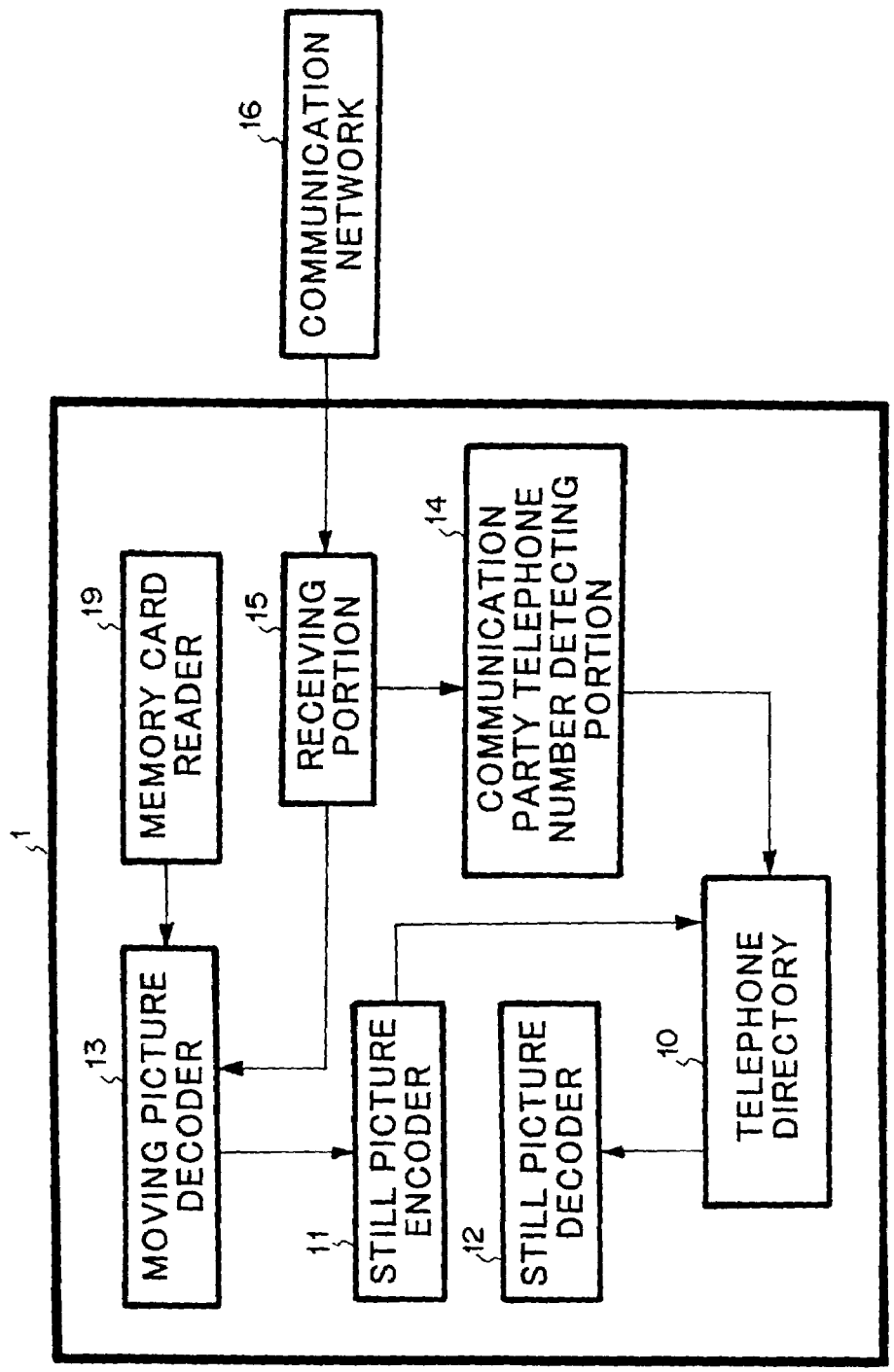

TELEPHONE UNIT HAVING TELEPHONE DIRECTORY WITH PICTURE DATA AND METHOD FOR GENERATING TELEPHONE DIRECTORY WITH PICTURE DATA

BACKGROUND OF THE INVENTION

1. Field of the Invention

The present invention relates to a telephone unit having a telephone directory with picture data, and in particular, to a picture data obtaining means and a method for correlating obtained picture data with character information such as telephone numbers.

2. Description of the Prior Art

In recent years, because of convenience, telephone units have been widely used. Correspondingly, they have been provided with high performance and high communication quality. In addition, it is expected that they will be developed as multimedia units having a variety of application functions.

As technologies that have been already accomplished, ringing melodies are known. Initially, telephone units were provided with only mechanical ringing tones that inform their users of incoming calls. Currently, the sound quality of ringing tones has been improved using for example four chords. Thus, the users can enjoy more advanced music. Regularly, ringing melodies for several songs can be stored in a memory of a telephone unit. They are correlated with telephone numbers stored in the telephone directory. When a call is terminated, a ringing melody corresponding to a caller's telephone number is generated. Thus, ringing melodies have been used as a caller identifying means.

In several years, it is expected that a technology that allows the data capacity transmitted and received to be remarkably increased will be accomplished. As a result, telephone units will be able to handle picture data.

Specifically, telephone units will be provided with a small camera, a picture codec, and so forth. Thus, the telephone units can be used as digital cameras or video cameras. Alternatively, telephone units will have a so-called television telephone function that allows picture data to be exchanged thereamong in real time.

Picture data captured to a telephone unit by such a means may be correlated with the telephone directory and used as a caller identifying means, similarly to a number display or a ringing melody.

Conventionally, in such a telephone unit having a telephone directory function with picture data, not only personal information such as telephone numbers and names, but also correlated picture data are pre-registered to the telephone directory. Thus, as disclosed in JPA 03-162087, when a call is terminated, picture data corresponding to the telephone number of the caller is displayed. In addition, as disclosed in JPA 11-041339, when a call is originated using the telephone directory function, the picture data corresponding to the particular information of the called party is displayed. Thus, according to the related art references, a calling party and a called party can be easily identified with visual information.

In addition, a picture data obtaining means and a method for correlating the picture data with character information such as telephone numbers are disclosed in for example JPA 11-205761. In FIG. 1, a telephone unit 3 is a telephone unit having a conventional digital camera function. picture data is obtained as captured picture of a camera 20. Alternatively, picture data is obtained through a communication network 16.

In the former case, a picture that is input from the camera 20 is converted into digital compressed picture data by a still picture encoder 11 and then stored in a telephone directory 10. In the latter case, a control signal is transmitted to a communication party 4 having the same digital camera function as the telephone unit 3. The control signal causes the communication party 4 to transmits the picture data to the telephone unit 3.

This point will be described in more detail. A control signal generating portion 21 of the telephone unit 3 generates a control signal that causes the communication party 4 to perform a photographing operation. The control signal is received by a receiving portion 24 of the communication party 4 from a transmitting portion 22 through a communication network 23. Thereafter, the signal is analyzed by a control signal processing portion 25. Corresponding to the analyzed result, a still picture encoder 27 is activated and then an input picture of a camera 26 is photographed.

Thereafter, the control signal generating portion 21 of the telephone unit 3 generates a control signal that causes the communication party 4 to transmit the photographed picture data. The control signal is received by the communication party 4 in the above-described manner.

After the communication party 4 analyzes the control signal, a transmitting portion 17 of the communication party 4 transmits the photographed picture data. The picture data is received by a receiving portion 15 of the telephone unit 3 through the communication network 16 and stored to the telephone directory 10. FIG. 2 shows the structure of the telephone directory 10. The picture data is stored to a picture memory 40 that is a structural element of the telephone directory 10. In addition, character information such as names and telephone numbers is stored to a character information memory 30 of the telephone directory 10. A picture-character information correlating memory 41 stores picture-character information correlating information composed of addresses of picture data stored in the picture memory 40 and addresses of character information stored in the character information memory 30.

However, there are problems in the related art reference. As a first problem of the related art reference, when the telephone unit causes the communication party to transmit picture data to be registered to the telephone directory to the telephone unit, a dedicated protocol that allows the communication party to perform the photographing operation and the transmitting operation is required.

As a second problem of the related art reference, in order to picture data and character information such as telephone numbers are correlated, the user is obliged to manually correlate the obtained picture data with character information and then register the correlated information with the telephone directory.

SUMMARY OF THE INVENTION

Therefore, an object of the present invention is to provide a method that allows picture data to be obtained without need to provide a dedicated protocol with the communication party.

Another object of the present invention is to provide a method that allows picture data and character information such as telephone numbers to be automatically correlated and registered to the telephone directory when a communication is performed without necessity of user's manual operation.

According to the present invention, there is provided a telephone unit having a telephone directory with picture data, comprising: receiving means for receiving compressed moving picture data from a communication party; first decoding means for decoding the compressed moving picture data; encoding means for encoding one or more frames of the decoded moving picture data into a compressed still picture data; correlating means for correlating the compressed still picture data with a telephone number of the communication party; registering means for registering the compressed still picture data and the telephone number with the telephone directory.

In the telephone unit having a telephone directory with picture data, the correlating means may correlate the compressed still picture data with personal information of the communication party, the personal information including the telephone number of the communication party. In the telephone unit having a telephone directory with picture data, the compressed still picture and the telephone number may be registered with the telephone directory in JPEG format, the telephone number being recorded in a comment segment of a JPEG file.

In the telephone unit having a telephone directory with picture data, the compressed still picture and the personal information may be registered with the telephone directory in JPEG format, the personal information being recorded in a comment segment of a JPEG file.

The telephone unit having a telephone directory with picture data, may further comprise: first displaying means for displaying the decoded moving picture; and selecting means for selecting the one or more frames to be encoded by the encoding means, in response to an operation by a user.

The telephone unit having a telephone directory with picture data may further comprise: second decoding means for decoding the compressed still picture data: and second displaying means for displaying the decoded still picture data.

In the telephone unit having a telephone directory with picture data, the display means may display the decoded still picture when originating a call to the communication party.

In the telephone unit having a telephone directory with picture data, the display means may display the decoded still picture when terminating a call from the communication party.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 3 is a schematic diagram showing the structure of a system of a telephone unit having a telephone directory function with picture data according to a first embodiment of the present invention;

FIG. 5 is a schematic diagram showing the structure of a telephone unit having a telephone directory with picture data, the unit being provided with a memory card reader.

DESCRIPTION OF PREFERRED EMBODIMENTS

Figure 1:
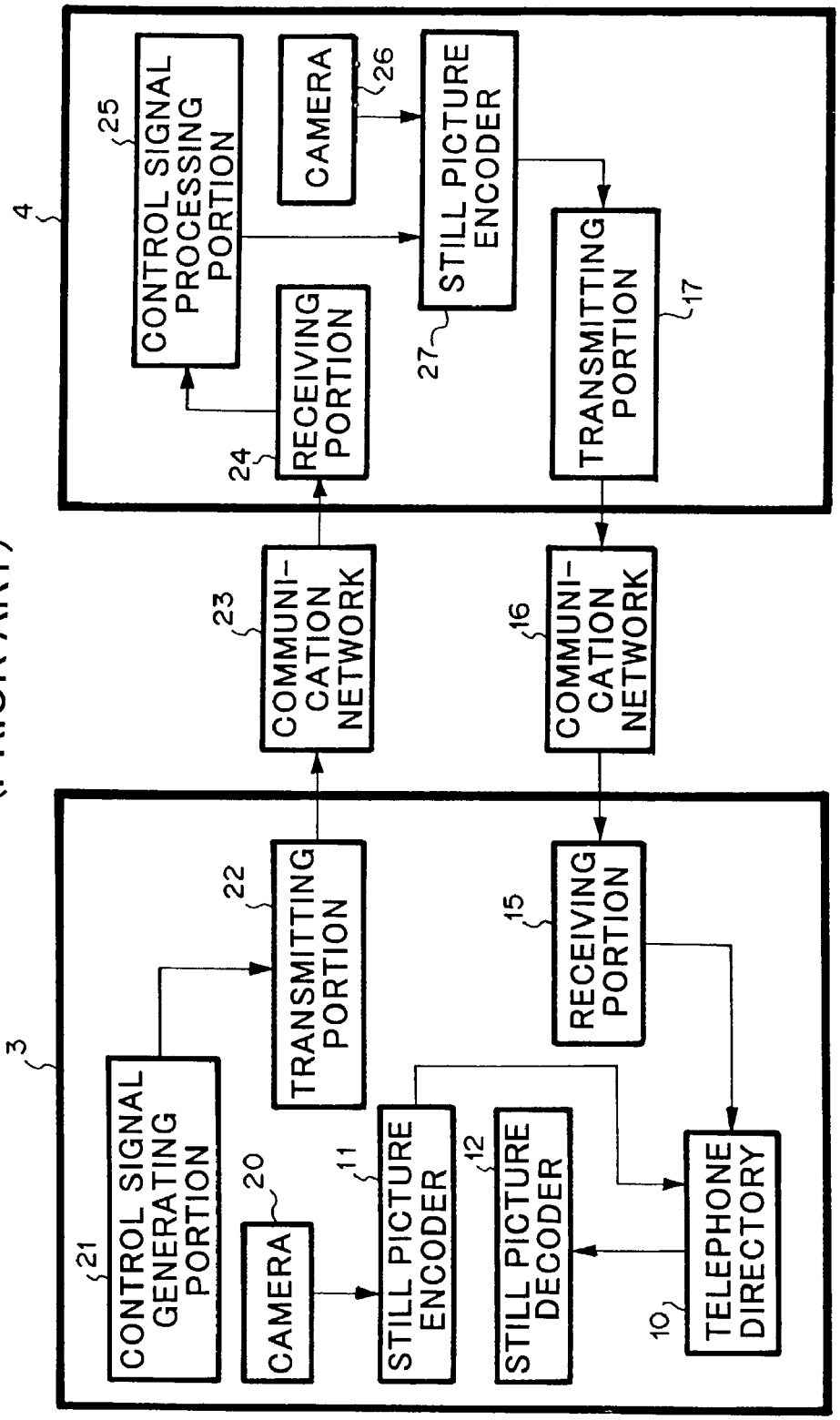
FIG. 1 is a schematic diagram showing the structure of a conventional system of a telephone unit having a telephone directory function with picture data.
Figure 2:
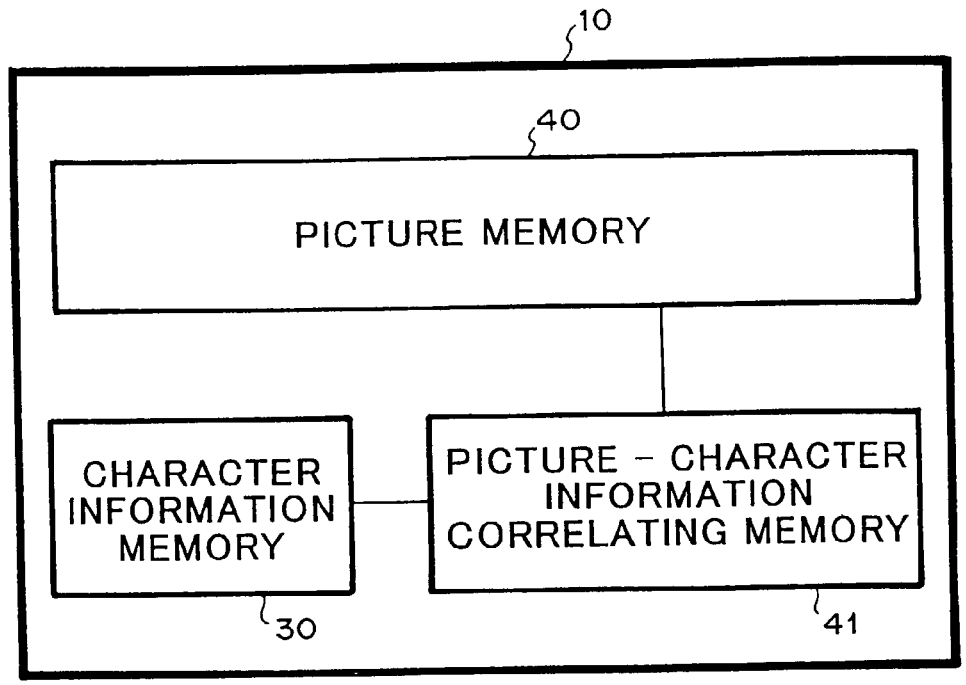
FIG. 2 is a schematic diagram showing the detailed structure of a portion of the system shown in FIG. 1.

Next, with reference to FIG. 3, a still picture encoding device for use with a telephone unit having a telephone directory function with picture data according to a first embodiment of the present invention will be described.

Reference numeral 1 represents a telephone unit having a telephone directory function with picture data according to the first embodiment. The telephone unit 1 is provided with a television telephone function and a digital camera function. A communication party 2 is a telephone unit that has the same television telephone function as the telephone unit 1. When the telephone unit 1 communicates with the communication party 2 using the television telephone function, a receiving portion 15 of the telephone unit 1 receives compressed moving picture data from the communication party 2 that has a moving picture encoder 18 through a communication network 16. The moving picture compressing system is for example H.263 or MPEG4.

While the received moving picture compressed data is successively decoded by a moving picture decoder 13 and displayed on a displaying device or the like, when the user of the telephone unit 1 performs an inputting operation equivalent to a shutter operation, one frame of the decoded moving picture is supplied to a still picture encoder 11. The still picture encoder 11 encodes the frame as compressed still picture data. The still picture compressing system is for example JPEG (Joint Photographic Experts Group).

Next, with reference to FIG. 3, a second embodiment will be described. Operations of a receiving portion 15, a moving picture decoder 13, and a still picture encoder 11 of a telephone unit 1, a communication party 2, and a communication network 16 according to the second embodiment are the same as those according to the first embodiment. According to the second embodiment, a communication party telephone number detecting portion 14 is disposed. The communication party telephone number detecting portion 14 is a circuit that detects the telephone number of the communication party 2. In the structure according to the first embodiment, when the user performs an inputting operation such as a shutter operation while using the television telephone function, a frame of picture data of decoded moving picture is encoded as still picture compressed data. In addition, the communication party telephone number detecting portion 14 detects the telephone number of the communication party 2 and stores it to the telephone directory 10 along with the compressed still picture data.

Figure 4:
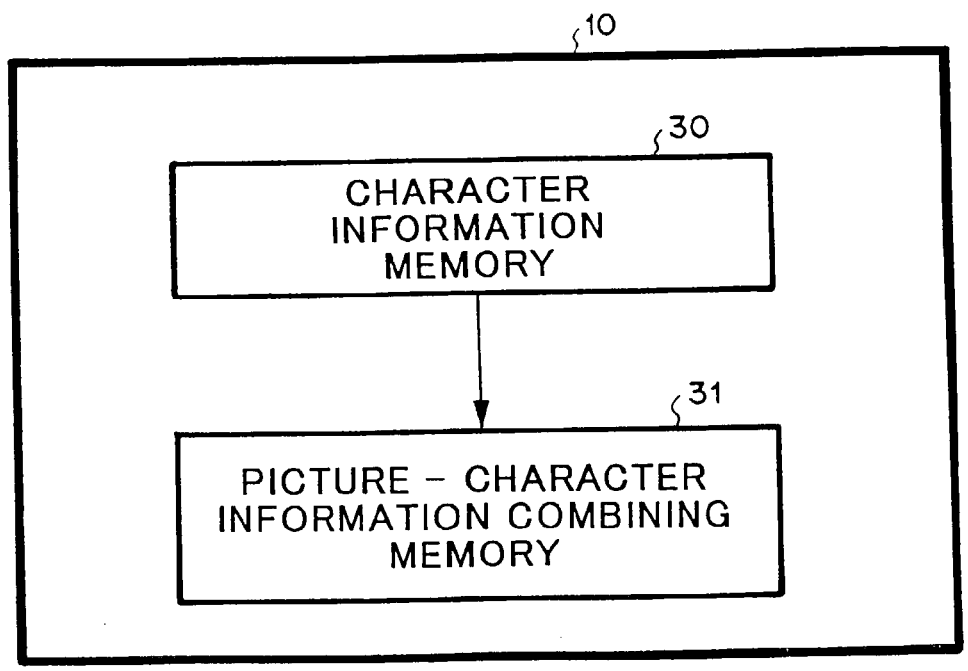
FIG. 4 is a schematic diagram showing the detailed structure of a portion of the system shown in FIG. 3.

Next, a third embodiment will be described. As shown in FIG. 4, a telephone directory 10 according to the third embodiment comprises a character information memory 30 and a picture-character information combining memory 31. Like the conventional system, the character information memory 30 stores character information such as names and telephone numbers. The picture character information combining memory 31 stores compressed still picture data to which character information of corresponding telephone numbers has been combined. In the third embodiment, when the communication party telephone number detecting portion 14 detects the telephone number of the communication party 2, if personal information such as the name corresponding to the telephone number has been registered with a character information memory 30 of the telephone directory 10, the telephone number and the corresponding personal information is combined to the compressed still picture data generated by the still picture encoder 11 and then stored to the picture-character information combining memory 31 together with the compressed still picture data. If the personal information corresponding to the telephone number has not been registered with the character information memory 42, only the detected telephone number is combined to the compressed still picture data generated by the still picture encoder 11 and stored to the picture-character information combining memory 31 together with the compressed still picture.

When character information is combined to compressed still picture data in accordance with the JPEG system, it is preferred to insert the character information into a comment segment of JPEG header information. When a call is originated using the telephone directory or when a call is terminated from a person who has been registered in the telephone directory, the compressed still picture data is decoded by the still picture decoder 12 and displayed on the displaying device or the like.

Next, a fourth embodiment of the present invention will be described. Several frames of still picture data constitute one record of personal information and are registered with a telephone directory 10 as one record. For example, repeating a number of the operations of the first embodiment, the corresponding number of frames of still pictures to which character information has been combined are stored to a picture-character information combining memory 31. When a call is terminated, frames of still pictures are successively decoded by a still picture decoder 12 and displayed on a displaying device or the like. Thus, the user can enjoy a frame step moving picture composed of such frames.

Next, with reference to FIGS. 3 and 5, a fifth embodiment of the present invention will be described. In the structure according to the first embodiment, when the communication network 16 is substituted with a short distance wireless line or a detachable memory card, moving picture compressed data may be obtained using for example a short distance wireless technology or the detachable memory card, respectively. The short distance wireless technology is for example Bluetooth or infrared ray technology. The detachable memory card is for example SD card, MMC, or memory stick.

As was described above, as a first effect of the present invention, picture data can be obtained without need to provide a dedicated protocol for the communication party. Thus, the communication party is not limited to a telephone unit made by the same company having the dedicated protocol. Thus, the present invention can be more widely used.

This is because the telephone unit according to the present invention has a moving picture decoding function and a still picture encoding function so as to decode compressed moving picture data and encoding a frame of the decoded moving picture to compressed still picture data.

As second effect of the present invention, picture data can be automatically correlated with character information such as telephone numbers and registered to the telephone directory. Thus, the user does not need to manually correlate picture data with telephone numbers and register the correlated data to the telephone directory.

This is because a means for detecting the telephone number of a calling party and automatically correlating character information corresponding to the telephone number with picture data is disposed.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A telephone unit having a telephone directory with picture data, comprising:
   receiving means for receiving compressed moving picture data from a communication party;
   first decoding means for decoding said compressed moving picture data;
   encoding means for encoding one or more frames of the decoded moving picture data into a compressed still picture data;
   correlating means for correlating said compressed still picture data with a telephone number of said communication party; and
   registering means for registering said compressed still picture data and said telephone number with said telephone directory,
   wherein the still picture data generated by said encoding means is in conformity with a still picture format which is different from a moving picture format with which the moving picture data is in conformity, and
   wherein said compressed still picture and said telephone number are registered with said telephone directory in JPEG (Joint Photographic Experts Group) format, said telephone number being recorded in a comment segment of a JPEG file.

2. The telephone unit having a telephone directory with picture data according to claim 1, further comprising;
   second decoding means for decoding said compressed still picture data; and
   second displaying means for displaying the decoded still picture data.

3. The telephone unit having a telephone directory with picture data according to claim 2, wherein said display means displays the decoded still picture when originating a call to said communication party.

4. The telephone unit having a telephone directory with picture data according to claim 2, wherein said display means displays the decoded still picture when a call is incoming from said communication party.

5. A telephone unit having a telephone directory with picture data, comprising:
   receiving means for receiving compressed moving picture data from a communication party;
   first decoding means for decoding said compressed moving picture data;
   encoding means for encoding one or more frames of the decoded moving picture data into a compressed still picture data;
   correlating means for correlating said compressed still picture data with a telephone number of said communication party, and
   registering means for registering said compressed still picture data and said telephone number with said telephone directory,
   wherein the still picture data generated by said encoding means is in conformity with a still picture format which is different from a moving picture format with which the moving picture data is in conformity,
   wherein said correlating means correlates said compressed still picture data with personal information of said communication party, said personal information including said telephone number of said communication party, and wherein said compressed still picture and said personal information are registered with said telephone directory in JPEG (Joint Photographic Experts Group) format, said personal information being recorded in a comment segment of a JPEG file.

6. The telephone unit having a telephone directory with picture data according to claim 5, further comprising:

second decoding means for decoding said compressed still picture data; and second displaying means for displaying the decoded still picture data.

7. The telephone unit having a telephone directory with picture data according to claim 6, wherein said display means displays the decoded still picture when originating a call to said communication party.

8. The telephone unit having a telephone directory with picture data according to claim 6, wherein said display means displays the decoded still picture when a call is incoming from said communication party.

9. A method for generating a telephone directory with picture data, comprising the steps of:

receiving compressed moving picture data from a communication party;

decoding said compressed moving picture data;

encoding one or more frames of the decoded moving picture data into a compressed still picture data;

correlating said compressed still picture data with a telephone number of said communication party; and registering said compressed still picture data and said telephone number with said telephone directory, wherein the still picture data generated by said encoding means is in conformity with a still picture format which is different from a moving picture format with which the moving picture data is in conformity, and wherein said compressed still picture and said telephone number are registered with said telephone directory in JPEG (Joint Photographic Experts Group) format, said telephone number being recorded in a comment segment of a JPEG file.

10. The method for generating a telephone directory with picture data according to claim 9, further comprising the steps of:

decoding said compressed still picture data; and displaying the decoded still picture data.

11. The method for generating a telephone directory with picture data according to claim 10, wherein the step of displaying the decoded still picture is performed when originating a call to said communication party.

12. The method for generating a telephone directory with picture data according to claim 10, wherein the step of displaying the decoded still picture is preformed when a call is incoming from said communication party.

13. A method for generating a telephone directory with picture data, comprising the steps of:

receiving compressed moving picture data from a communication party;

decoding said compressed moving picture data;

encoding one or more frames of the decoded moving picture data into a compressed still picture data;

correlating said compressed still picture data with a telephone number of said communication party; and registering said compressed still picture data and said telephone number with said telephone directory, wherein the still picture data generated by said encoding means is in conformity with a still picture format which is different from a moving picture format with which the moving picture data is in conformity, wherein said correlating step correlates said compressed still picture data with personal information of said communication party, said personal information including said telephone number of said communication party, and wherein said compressed still picture and said personal information are registered with said telephone directory in JPEG (Joint Photographic Experts Group) format, said personal information being recorded in a comment segment of a JPEG file.

14. The method for generating a telephone directory with picture data according to claim 13, further comprising the steps of:

decoding said compressed still picture data; and displaying the decoded still picture data.

15. The method for generating a telephone directory with picture data according to claim 14, wherein the step of displaying the decoded still picture is preformed when originating a call to said communication party.

16. The method for generating a telephone directory with picture data according to claim 14, wherein the step of displaying the decoded still picture is performed when a call is incoming from said communication party.

* * * * *